United States Patent [19]

Miracle

[11] 4,181,836
[45] Jan. 1, 1980

[54] CIRCUIT BREAKER WITH EXTERIOR INSULATING BOOT

[75] Inventor: William C. Miracle, Winchester, Ky.

[73] Assignee: Square D Company, Palatine, Ill.

[21] Appl. No.: 863,644

[22] Filed: Dec. 23, 1977

[51] Int. Cl.$^2$ .............................................. H01H 9/34
[52] U.S. Cl. .............................. 200/144 R; 174/138 F; 200/149 B; 200/304
[58] Field of Search .......................... 174/5 R, 138 F; 200/149 B, 304, 305, 144 R; 335/201; 339/116 R, 116 C; 361/353

[56] References Cited

U.S. PATENT DOCUMENTS

| | | | |
|---|---|---|---|
| 2,152,780 | 4/1939 | Wheeler | 200/304 |
| 3,165,574 | 1/1965 | Carling | 174/138 F X |
| 4,045,751 | 8/1977 | Schuessler et al. | 200/144 R X |

Primary Examiner—Laramie E. Askin
Attorney, Agent, or Firm—Norton Lesser; Richard T. Guttman

[57] ABSTRACT

The following specification describes a thin walled insulating boot formed of a thermoplastic molding material and attached by means of the circuit breaker in encircling relationship to the open end of the breaker. The boot prevents ionized gas created when the circuit breaker is tripped from completing a circuit path to adjacent metal portions. The boot walls extend past the open end of the breaker and a back wall spaced from the open end of the circuit breaker defines a chamber enabling expansion of the ionized gas.

10 Claims, 5 Drawing Figures

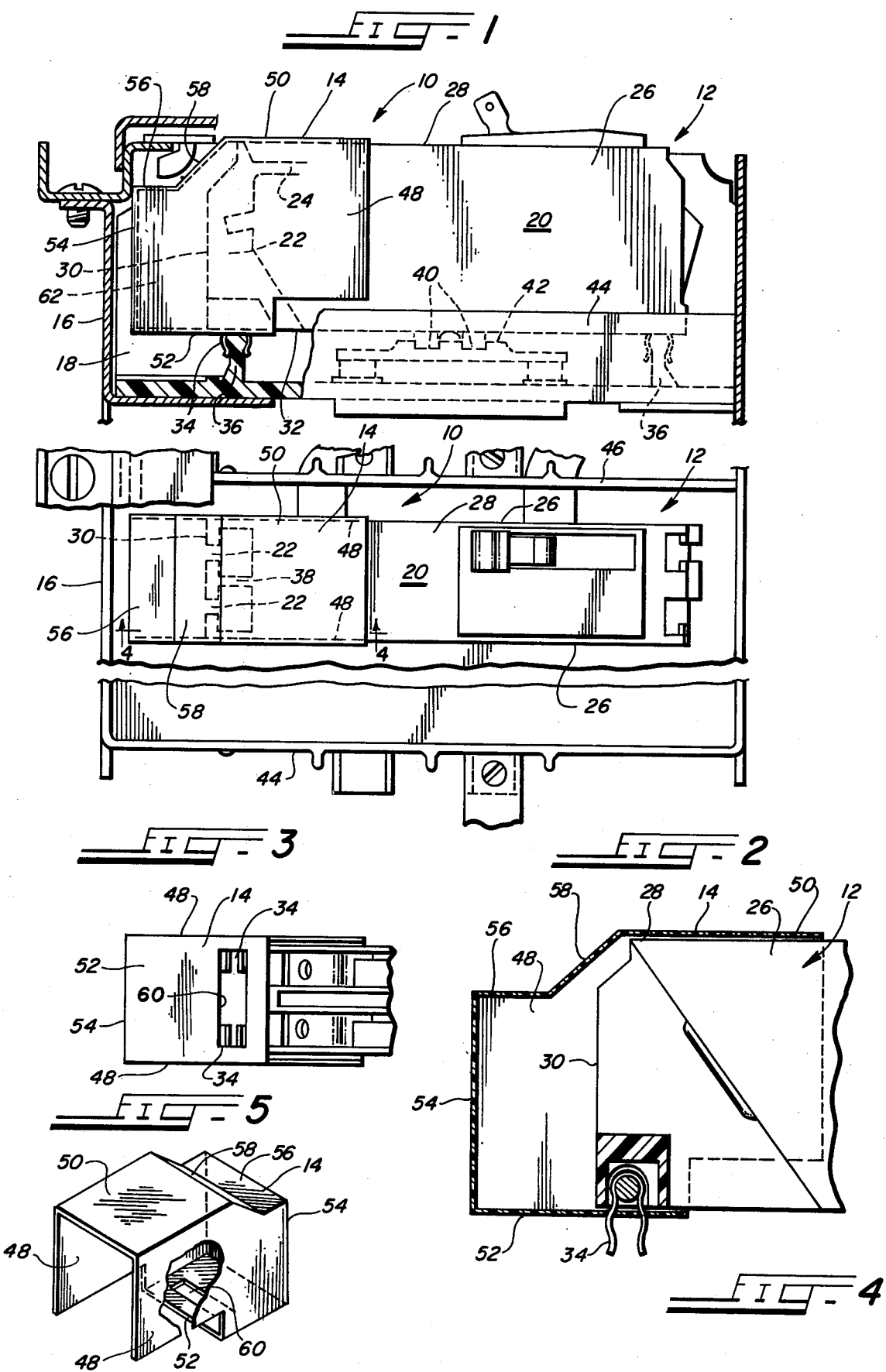

CIRCUIT BREAKER WITH EXTERIOR INSULATING BOOT

Field of the Invention

This invention relates to arc suppression devices for circuit breakers and more particularly to an improved and/or economical protection device for preventing ionized gas created on tripping of a circuit breaker from completing an inadvertent circuit.

Summary of the Prior Art

Conventional circuit breakers such as illustrated, for example, in U.S. Pat. No. 3,283,216 employ a pair of contacts which trip or open in response to a fault current for interrupting the fault current. The contacts on opening generate an arc. An arc chamber which may contain a plurality of arc suppression plates, is provided adjacent one open end of the breaker housing and a passage extends from the chamber to the open end of the breaker housing to enable the hot ionized gas to escape without creating damage.

Because of the proximity of adjacent grounded metal walls, such as a portion of the enclosure or cabinet, to the housing end, the arc may sometimes be maintained in the event the ionized gas completes a circuit to an adjacent metal wall. This creates a hazardous or undesirable situation.

Summary of the Invention

This invention utilizes the simple expedient of forming a thin walled insulating enclosure or boot assembled in overlapping engagement with the open end of the circuit breaker to close the passage from the arc suppression chamber. This prevents ionized gas created on tripping the breaker from engaging any associated metal wall.

The boot comprises integral top, bottom and side walls forming a generally ring shaped portion engaging a respective wall portion of the breaker and extending past the open end of the breaker where the walls are integrally joined by a back wall. The boot thus closes the open end of the breaker and by spacing the back wall of the boot from the open end of the breaker a chamber is provided for gas expansion to relieve the pressure of the ionized gas.

A passage in the bottom wall of the boot receives the mounting clip of the circuit breaker and serves to both retain the boot on the breaker and to space the back wall of the boot properly relative to the open end of the breaker and the associated wall portions.

The boot is formed of a high strength thermoplastic material such as a polyphenylene oxide-styrene material sold by General Electric Co. under the name Noryl. This material has suitable dielectric, heat resistant and other properties and permits the walls to be formed extremely thin so that the boot can be received between adjacent closely spaced portions of the cabinet and mounting pan or breaker compartment.

It is therefore a primary object of the present invention to provide economical means for preventing ionized gas exiting from a circuit breaker from completing an inadvertent electrical circuit.

Other objects and features of the present invention will become apparent on examination of the following specification and claims together with the drawings.

BRIEF DESCRIPTION OF THE DRAWINGS

FIG. 1 is a side elevational view of an assembled circuit breaker and boot incorporating the principles of the present invention and illustrating a portion of a breaker compartment and cabinet used in a meter center.

FIG. 2 is a top elevational view of the assembled circuit breaker and boot together with a related compartment and cabinet portion.

FIG. 3 is a bottom elevational view illustrating the boot and a fragmentary portion of the associated breaker end in FIG. 1.

FIG. 4 is a fragmentary sectional view of the breaker and boot taken generally along the line 4—4 in FIG. 2; and FIG. 5 is an isometric view of the boot.

DESCRIPTION OF THE PREFERRED EMBODIMENT

In FIG. 1 a circuit breaker and boot assembly incorporating the principles of the present invention is indicated generally by the reference character 10. The circuit breaker and boot assembly 10 comprises a circuit breaker 12 and a boot 14 of insulating material. The breaker 12 is of a type utilized in a meter center having a cabinet or enclosure defined in part by a metal wall 16 and a circuit breaker compartment 18. Such meter center is noted on pages 26 and 28 of a Catalog Digest 156 published by the Square D Company in July 1975 and may be used in residential construction of the type previously mentioned. It should be understood however that the concepts of the present invention are not limited to meter centers but are generally applicable to numerous other situations.

The circuit breaker 12 is defined by a housing 20 having a conventional arc chamber communicating with an open end 22 of the circuit breaker housing through a passage 24 adjacent the upper left end of the breaker housing 20 as viewed in FIG. 1. Ionized gas exits from the passage 24 through the open end 22 of the breaker housing in response to tripping of the breaker. The ionized gas may complete a circuit to the adjacent sheet metal wall 16 and/or the bracket or trim plate assembly supported by the cabinet. This is hazardous and may prevent quick extinction of the arc.

The housing 20 comprises, side walls 26 and a top wall 28 all having generally planar surfaces and each terminating in a generally planar rear edge surface 30 and a bottom end surface 32 through which mounting clips 34 project adjacent opposite ends of the breaker for supporting the breaker on mounting ribs 36 of the compartment 18. The rear edge surface 30 is leveled adjacent the upper end of breaker housing and an intermediate portion wall 38 having the same rear surface configuration as the side walls divides the open end into two portions. Terminal clips 40 also project through the bottom of the breaker for engaging a connector 42 in the compartment 18 to extend a connection through the breaker to a terminal adjacent the breaker end opposite end 22.

The walls of the breaker housing are not only closely spaced to adjacent metal walls and to the insulating walls 44 and 46 of the compartment and to ribs 36, but because of their planar surfaces, do not conveniently lend themselves to attachment of additional arc suppression devices, without added attachment apparatus. The applicant however has designed the boot 14 for convenient facile attachment to the circuit breaker without fastening devices by taking advantage of the mounting clips 34.

The boot 14 comprises an integral one piece housing or enclosure formed of the aforementioned thermoplastic material having the required strength, rigidity and dielectric properties. The boot is provided with 3" long side walls 48 spaced apart substantially 1.5" and a top wall 50 for engagement respectively with the side and top walls of the housing 16. A bottom wall 52 substantially 1.8" long interconnects the side walls 48 at a position spaced intermediate the ends of the side walls 48. The side walls 48, top wall 50 and bottom wall 52 extend beyond the open end 22 of the circuit breaker housing 20 and are interconnected by a back wall 54 formed integrally with the other walls of the boot.

The back wall 54 is spaced from the rear or open end 22 of the housing 20 and extends upwardly for substantially 1.8" and terminates at a lower level portion 56 of the top wall 50 and below the top wall of the breaker. The portion 56 is substantially 0.72" long and is interconnected with top wall 50 by a sloping top wall portion 58 having an inclination of substantially 45° to the vertical. The wall portion 58 is thus spaced slightly from the bevelled portion of the breaker and facilitates entrance of the boot into the space beneath the trim assembly.

The bottom wall 52 of the boot extends just past the mounting clips 34 to underlie the bottom portion of the housing 20 adjacent the open end. A slot 60 substantially 0.36" wide in the bottom wall and having front and rear edges spaced respectively substantially 0.36" from the front edge of wall 52 and 1 1/16" from rear wall 54 receives the mounting clip 34. The edges of the slot or passage 60 engaging the clip positions and retains the boot relative to the housing with the space between open end 22 of housing 20 and walls 52, 54 and 56 serving to define a chamber 62 into which ionized gas may expand and which completely encloses the gas to prevent engagement with adjacent metal walls.

The walls 48, 50, 52, 54, 56 and 58 of the boot thus form a cup having a peripheral wall nonrotatably engaging the breaker housing. The boot has a maximum wall thickness of 0.03" so that the boot 14 and housing 20 are easily received between the adjacent walls of the cabinet and compartment. To attach the boot 14 to the housing 20, the open end 22 of circuit breaker housing is inserted between the side walls 48 at an angle to align the clips with slot 60. Terminating bottom wall 52 just past the front edge of slot 60 enables this alignment to be facilely provided since the clips may be moved partially into the slot. When the clips 34 are aligned with the slot 60, the upper end of the housing 20 is spaced from the top wall 50 and the breaker is simply pivoted into longitudinal alignment with the side walls to move the clips through slot 60. The breaker housing is thus nonrotatably encircled by the peripheral wall or nestingly received between the boot walls with the clips preventing undue longitudinal movement therebetween. The boot is now attached to the breaker.

The foregoing constitutes a description of an improved circuit breaker boot and assembly, whose inventive concepts are believed set forth in the accompanying claims.

We claim:

1. In combination with a circuit breaker having a housing with a passage through which ionized gas passes in response to the tripping of said breaker, the improvement comprising:
   an electrically nonconductive member having an integrally formed peripheral wall nestingly receiving a portion of said breaker housing in encircling relationship to said breaker housing,
   a member back wall of electrically nonconductive material integrally formed on said member,
   and means integrally formed on said nonconductive member detachably attaching said member to said breaker with the back wall of said member spaced from said passage to form an expansion chamber for ionized gas passing through said passage and for preventing said gas from engaging a metal member adjacent said housing.

2. The combination claimed in claim 1 in which said housing includes bottom, top and side walls interconnected by a back wall through which said passage extends, said peripheral wall includes a member bottom wall nestingly receiving a portion of said bottom wall of said circuit breaker housing and said peripheral wall includes member top and side walls extending with said member bottom wall past said passage to said member back wall to form a substantially closed expansion chamber for said gas.

3. In the combination claimed in claim 2, a mounting clip for said circuit breaker projecting from the bottom wall of said breaker, and said means integrally formed on said nonconductive member detachably attaching said member includes a member passage in said member bottom wall receiving said clip.

4. The combination claimed in claim 3 in which the edges of said member passage engage said clip to restrain displacement of said member back wall towards and from said passage.

5. The combination claimed in claim 4 in which said member bottom wall is terminated at a position intermediate said member back wall and one end of said member side walls spaced from said member back wall for enabling the receipt of said circuit breaker at an angle to the longitudinal axis of said member and the alignment of said clip with said member passage.

6. The combination claimed in claim 5 in which each wall of said electrically nonconductive member is no more than 0.03" thick.

7. The combination claimed in claim 6 in which said electrically non-conductive member is formed of a thermoplastic material.

8. A combination comprising a circuit breaker having a housing carrying a mounting clip adjacent one end, a passage in said one end through which ionized gas passes in response to the tripping of said breaker, said housing including a generally planar top wall and generally planar spaced side walls, a generally planar surface at said one end and a generally planar bottom surface,
   an integrally formed electrically nonconductive member comprising a pair of member side walls telescopingly receiving the side walls of the housing therebetween, a top wall telescopingly receiving the top wall of said housing and a bottom wall telescopingly receiving the bottom surface of said housing adjacent said one end of said breaker top and side walls,
   a back wall integrally formed on said member interconnected with said member top, bottom and side walls, and means integrally formed on said member engaging said mounting clip and detachably attaching said member to said breaker with the back wall of said member spaced from the back wall of said breaker to form an explosion chamber for ionized gas exiting from said passage and for preventing said gas from engaging an adjacent metal wall.

9. The combination claimed in claim 8 in which said means integrally formed on said member is a passage in said member bottom wall receiving said mounting clip.

10. The combination claimed in claim 9 in which said member is formed of thermoplastic material and each wall of said member is no more than substantially 0.03" thick.

* * * * *

UNITED STATES PATENT AND TRADEMARK OFFICE
CERTIFICATE OF CORRECTION

PATENT NO. : 4,181,836
DATED : January 1, 1980
INVENTOR(S) : William C. Miracle

It is certified that error appears in the above–identified patent and that said Letters Patent are hereby corrected as shown below:

Column 5, line 5, change "explosion" to --expansion--.

Signed and Sealed this

Twenty-ninth Day of July 1980

[SEAL]

Attest:

SIDNEY A. DIAMOND

Attesting Officer

Commissioner of Patents and Trademarks